United States Patent [19]

Kassai

[11] Patent Number: 4,697,823
[45] Date of Patent: Oct. 6, 1987

[54] MECHANISM FOR LOCKING OPENED AND CLOSED STATES OF BABY CARRIAGE

[75] Inventor: Kenzou Kassai, Osaka, Japan

[73] Assignee: Aprica Kassai Kabushikikaisha, Osaka, Japan

[21] Appl. No.: 864,582

[22] Filed: May 16, 1986

[30] Foreign Application Priority Data

Jul. 17, 1985 [JP] Japan .................. 60-109190[U]

[51] Int. Cl.⁴ ............................................. B62B 7/06
[52] U.S. Cl. ..................................... 280/644; 280/42; 280/650; 280/658; 297/45; 297/DIG. 4
[58] Field of Search ............... 280/42, 642, 643, 644, 280/647, 649, 650, 658, 47.4, 47.41; 297/61, 396, 408, 45, DIG 4

[56] References Cited

U.S. PATENT DOCUMENTS 4,317,581  3/1982  Kassai ........................... 280/650

FOREIGN PATENT DOCUMENTS 50705  10/1982  Japan .
66274  11/1982  Japan .
32065   7/1983  Japan .

Primary Examiner—John J. Love
Assistant Examiner—Richard Camby
Attorney, Agent, or Firm—W. G. Fasse; D. H. Kane, Jr.

[57] ABSTRACT

One end of a support angle member is turnably connected to the lower end of a push rod, and the other end of the support angle member is turnably connected to the middle portion of a rear leg. When the push rod is aligned with one end of the support angle member, a sleeve urged by a spring to slide downward on the push rod engages the opened state locking-purpose engaging portion of the support angle member, thereby locking the opened state of a baby carriage. When the baby carriage is to be locked in its closed state, the sleeve engages the closed state locking-purpose engaging portion of the support angle member, thereby locking the closed state. The sleeve is formed with a lock canceling-purpose engaging projection, while the support angle member is formed with opened and closed state canceling-purpose engaging projections, respectively, which, in canceling the lock of the opened or closed state, engage the lock canceling-purpose engaging projection to thereby temporarily hold the sleeve out of engagement with the opened or closed state locking-purpose engaging portion.

7 Claims, 13 Drawing Figures

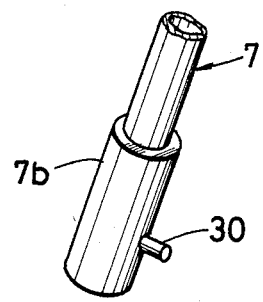
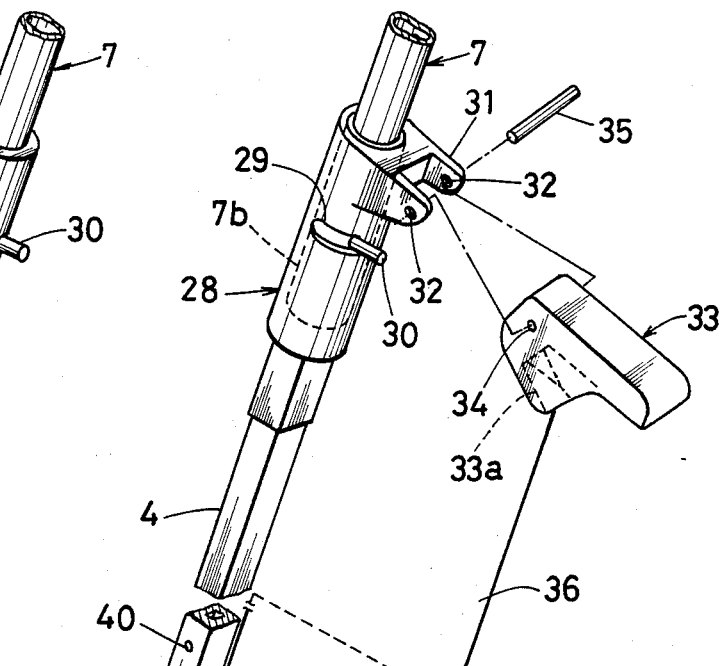
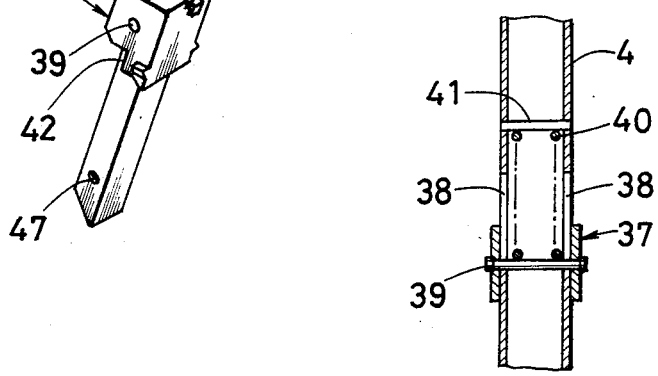

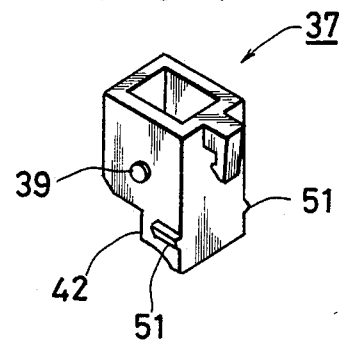
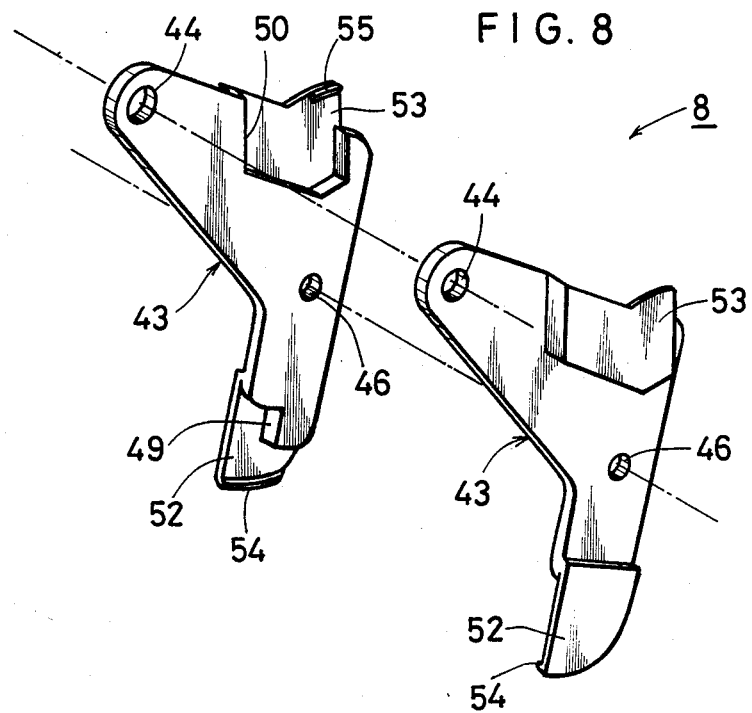

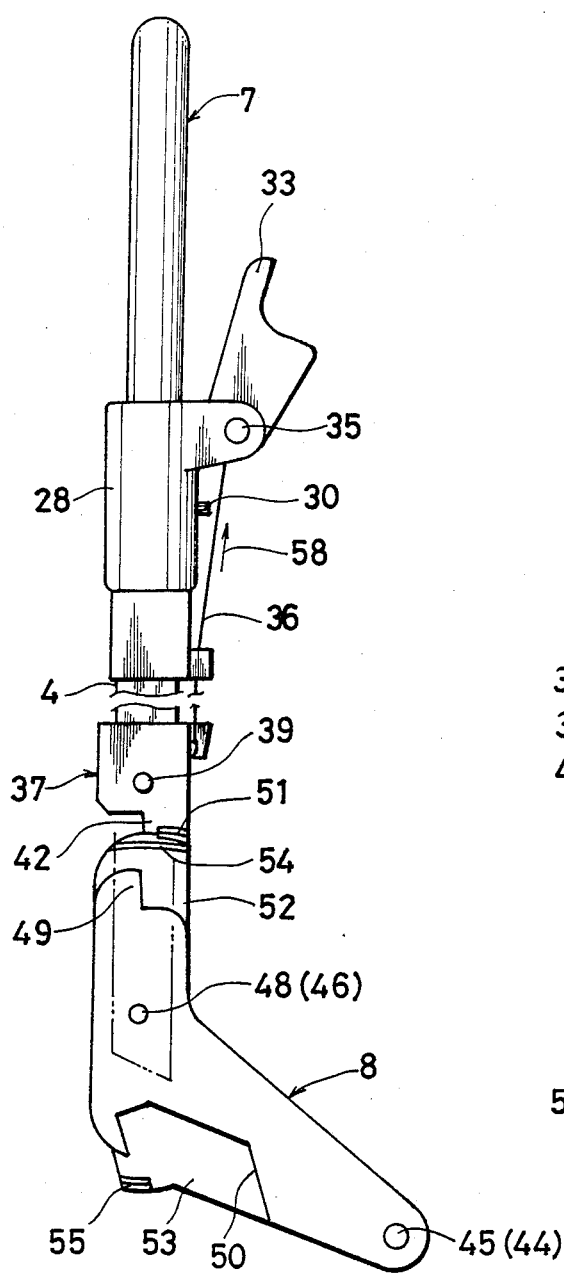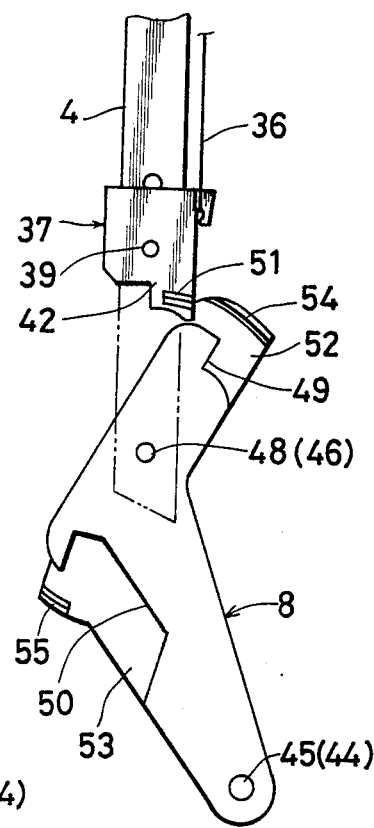

MECHANISM FOR LOCKING OPENED AND CLOSED STATES OF BABY CARRIAGE

BACKGROUND OF THE INVENTION

1. Field of the Invention

This invention relates to improvements in a mechanism for locking both the opened and closed states of a foldable baby carriage.

2. Description of the Prior Art

An example of a foldable baby carriage to which this invention is applicable is disclosed in Japanese Patent Application No. 132136/1979 (Japanese Patent Application Laid-Open No. 57574/1981, Japanese Patent Publication No. 50705/1982; substantially corresponding to U.S. Pat. No. 4,317,581). The baby carriage disclosed therein comprises, as parts which enable the folding thereof, a pair of rear legs extending rearwardly downward from the middle of the baby carriage, a pair of support angle members turnably connected respectively to the middle portions of said rear legs so that they are turnable to extend along the upper or lower halves of the rear legs, a pair of push rods turnably connected at their lower ends to the middle portions of the support angle members, a pair of sleeves axially slidably installed adjacent the lower ends of the push rods, and springs for urging the sleeves to slide downward. Further, each support angle member is formed at its end (the other end) opposite to one end thereof connected to the rear leg with an engaging portion engageable by the sleeve for locking the opened state.

In such baby carriage, when it is opened, the support angle members are positioned along the upper halves of the rear legs while the other ends of the support angle members are aligned with the push rods, whereupon the sleeves slide downward until they engage the open state locking-purpose engaging portions of the support angle members. Thereby, the aligned state of the push rods and support angle members is maintained, with the result that the opened state of the baby carriage is locked.

Further, Japanese Patent Application No. 84159/1980 (Japanese Patent Application Laid-Open No. 11168/1982, Japanese Patent Publication No. 32065/1983) discloses a baby carriage of the same basic construction as in said first application, with the following improvements applied thereto. In the baby carriage of this second application, to lock both the opened and closed states, the support angle member is additionally formed with a closed state locking-purpose engaging portion, while the sleeve is designed to be engageable with both the opened and closed state locking-purpose engaging portions of the sleeve. In the opened state of the baby carriage, the situation is the same as in the first application described above, but in the closed state of the baby carriage, each support angle member is positioned along the lower half of the rear leg while the middle portion of the support angle member intersects the push rod, and in this state, each sleeve engages the closed state locking-purpose engaging portion of the support angle member, thereby locking this closed state.

According to this second application, both the opened and closed states of the baby carriage are locked by using such common members as the sleeves, so that a reduction in the number of parts can be expected.

However, in said second application, when the simplicity of operation is further investigated, it is seen that there is still room for improvement. That is, when it is desired to change the opened or closed state of the baby carriage to its closed or opened state, respectively, it is necessary to first remove the locking. This removal of the locking is attained by sliding the sleeve along the push rod to escape from the opened or closed state locking-purpose engaging portion, but since the sleeve is urged by a spring to move in a direction for engagement with the opened or closed state locking-purpose engaging portion, it is necessary that the force required to cause the sleeve to escape from said engaging portion be applied continuously at least in the early period of operation for opening or closing the baby carriage. On the other hand, in the case of means being provided for maintaining the sleeve in its state escaping from the engaging portion against the force of the spring, it is necessary that at the end of the opening or closing operation, said means for maintaining said state of escape be operated again to allow the sleeve to engage the engaging portion.

As for a technique for eliminating said inconvenience in operation, there is one disclosed in Japanese Patent Application No. 66274/1981 (Japanese Patent Application Laid-Open No. 182566/1982). In this third application, which is an improvement on said second application, the arrangement for maintaining the state of the sleeve escaping from the engaging portion is adopted on the one hand and on the other hand means is provided for canceling the escape state of the sleeve in the course of operation from the opened to the closed state of the baby carriage and in the course of operation from the closed to the opened state thereof, so that finally, when the baby carriage is brought to its opened or closed state, the sleeve automatically engages the opened or closed state locking-purpose engaging portion.

In this third application, there is provided a lock start member arranged like a cam adapted to rotate together with a foldable push rod connecting member for connecting a pair of push rods, said lock start member being adapted to act on an operating lever which controls the sleeve movement to prepare for locking the opened or closed state of the baby carriage. The lock start member is adapted to turn in response to the folding movement of the push rod connecting member, and the folding movement of the push rod connecting member is attained because the distance between the pair of push rods changes depending on whether the baby carriage is in its opened or closed state.

SUMMARY OF THE INVENTION

This invention is intended to improve said third application.

More particularly, the invention disclosed in the third application, though making convenient the opening and closing operation of the baby carriage, has a disadvantage that in the course of opening and closing operation, when the lock start member acts on the operating lever, a force which impedes the progress of this operation is produced, so that the opening and closing operation cannot be smoothly performed. Further, since such load which interferes with the opening and closing operation is produced in the course of opening and closing operation, it sometimes occurs that the opening and closing operation, which is proceeding smoothly, comes to a stop half way.

Further, the foldable baby carriage disclosed in the third application is so arranged that when performing the opening and closing operation, all the frame members are moved into an operative relationship to each other, but actually all frame members cannot move at the same time. For example, when the baby carriage is to be changed from the closed to opened state, the bent push rod connecting member is straightened, tending to widen the distance between the push rods, but these push rods do not have their distance widened while their parallel state is maintained but the distance is widened first at the place where the push rod connecting member is provided and then at another place; thus, there is a time lag which cannot be avoided. As a result, when the baby carriage is operated for opening or closing, if this is effected with a force applied from the push rod connecting member, locking would be applied again to make an opening or closing operation impossible if the push rod connecting member alone proceeds to operate at the stage where the angle between the push rod and the support angle member has not changed so much though the operating lever is operated to cancel the locked state of the sleeve. At this time, if the operator is not aware of the locking applied again and performs the opening or closing operation, this can lead to fatal damage to the baby carriage.

Accordingly, this invention is intended to provide a mechanism for locking the opened and closed states of a baby carriage which is capable of maintaining the unlocked state of the baby carriage during the opening and closing operation of the baby carriage and which, upon completion of the opening and closing operation, automatically locks the opened or closed state, said mechanism being capable of smoothing the opening and closing operation of the baby carriage and establishing a lock-ready state without fail even if there is a time lag in the movement of the frame members caused during opening and closing operation of the baby carriage.

According to this invention, a mechanism for locking the opened and closed states of a baby carriage comprises:

a. a pair of rear legs extending rearwardly downward from the middle portion of the baby carriage, b. a pair of support angle members each turnably connected at one of their respective ends to the middle portion of the baby carriage, whereby they are turnable to extend along the upper or lower halves of said rear legs, c. a pair of push rods turnably connected at the lower ends thereof respectively to the middle portions of said support angle members, d. a pair of sleeves axially slidably installed adjacent the lower ends of said push rods, e. springs for urging said sleeves downward, f. each said support angle member being formed at the other end thereof with an opened state locking-purpose engaging portion and at the middle portion thereof with a closed state locking-purpose engaging portion, g. in the opened state of the baby carriage, each support angle member being positioned along the upper half of the rear leg while the other end of the support angle member is aligned with the associated push rod, and in order to lock this state, each sleeve sliding downward to engage said open state locking-purpose engaging portion of the associated support angle member, h. in the closed state of the baby carriage, each support angle member being positioned along the lower half of the associated rear leg while its middle portion intersects the push rod, and in order to lock this state, each sleeve sliding downward to engage said closed state locking-purpose engaging portion.

The aforesaid technical problem about the opened and closed state locking mechanism is solved as follows.

The surface of said sleeve opposed to said support angle member is formed with a lock canceling-purpose engaging projection.

The support angle member is formed with first and second elastically deformable bulging walls bulging from said opened and closed state locking-purpose engaging portions.

The first and second bulging walls are respectively formed with opened and closed state canceling-purpose engaging projections adapted to engage said lock canceling-purpose engaging projection on said sleeve escaping from said said opened and closed state locking-purpose engaging portions so as to temporarily retain the position of said sleeve on said push rod against the force of said spring.

When the baby carriage is to be changed from the opened to closed state, the sleeve engaged with the opened state locking-purpose engaging portion of the support angle member is caused to escape therefrom and the lock canceling-purpose engaging projection is caused to engage the opened state canceling-purpose engaging projection on the support angle member. Thereby, the lock which is acting in the opened state of the baby carriage is canceled, making it possible to operate the baby carriage for its closed state. With this operation, the angle between the push rod and the support angle member changes, canceling the engagement between the lock canceling-purpose engaging projection and the opened state canceling-purpose engaging projection, whereupon the sleeve is displaced downward on the push rod by the spring to make ready for enabling locking in the closed state. When the baby carriage is finally brought to the closed state, the sleeve engages the closed state locking-purpose engaging portion, thereby establishing the locked state.

On the other hand, when the baby carriage is to be changed from the opened to closed state, first the sleeve is caused to escape from the closed state locking-purpose engaging portion and the lock canceling-purpose engaging projection is engaged with the closed state canceling-purpose engaging projection. In this state, when the baby carriage is operated for opening, the angle between the support angle member and the push rod changes, canceling the engagement between the lock canceling-purpose engaging projection and the closed state canceling-purpose engaging projection. Thereupon, the sleeve is urged again by the spring to slide downwardly of the push rod, thus making ready to engage the opened state locking-purpose engaging portion when the baby carriage is opened. Therefore, when the baby carriage is finally opened, the sleeve engages the opened state locking-purpose engaging portion to lock the opened state.

As described above, according to this invention, means for temporarily canceling the locking is provided to both the sleeve and support angle member which contribute directly to the locking of the opened and closed states of the baby carriage. That is, the sleeve is formed with a lock canceling-purpose engaging projection, while the support angle member is formed with an opened state canceling-purpose engaging projection and a closed state canceling-purpose engaging projection. Therefore, when the baby carriage is changed from the opened to closed state or from the closed to opened state, relative rotation between the push rod and the support angle member results in automatic canceling of the engagement between the lock canceling-purpose engaging projection and the opened state canceling-purpose engaging projection or closed state canceling-purpose engaging projection. Thus, during opening and closing operation of the baby carriage, such opening and closing operation can be performed without inducing any extra load, and even if the opening and closing operation of the baby carriage fails to proceed simultaneously with respect to all members, the possibility of returning again to the locked state is avoided.

As described above, according to this invention, when the baby carriage is brought to the opened or closed state, it is automatically locked, and when the baby carriage is to be operated for opening or closing by canceling said locking, a ready state for locking the opened or closed state to be subsequently established can be attained in the course from the opened to closed state or from the closed to opened state. Thus, a baby carriage convenient to operate can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view showing an operatively connecting portion between an operating lever 33 and a sleeve 37 in the baby carriage of FIG. 1;

FIG. 5 is a perspective view showing the end portion 7b of a push rod connecting member 7;

FIG. 6 is a sectional view of a push rod 4 taken adjacent the sleeve 37 of FIG. 4;

FIG. 7 is a perspective view singly showing the sleeve 37;

FIG. 8 is an exploded perspective view of a support angle member 8; and

FIGS. 9 through 13 are views for explaining the relative movement of the push rod 4, support angle member 8 and sleeve 37, FIG. 9 corresponding to the opened state of the baby carriage, FIG. 10 showing the lock canceled in the opened state, FIG. 11 showing a state obtained intermediate between the opened and closed states, FIG. 12 corresponding to the opened state of the baby carriage, and FIG. 13 showing the lock canceled in the closed state.

DESCRIPTION OF THE PREFERRED EMBODIMENTS

Figure 1:
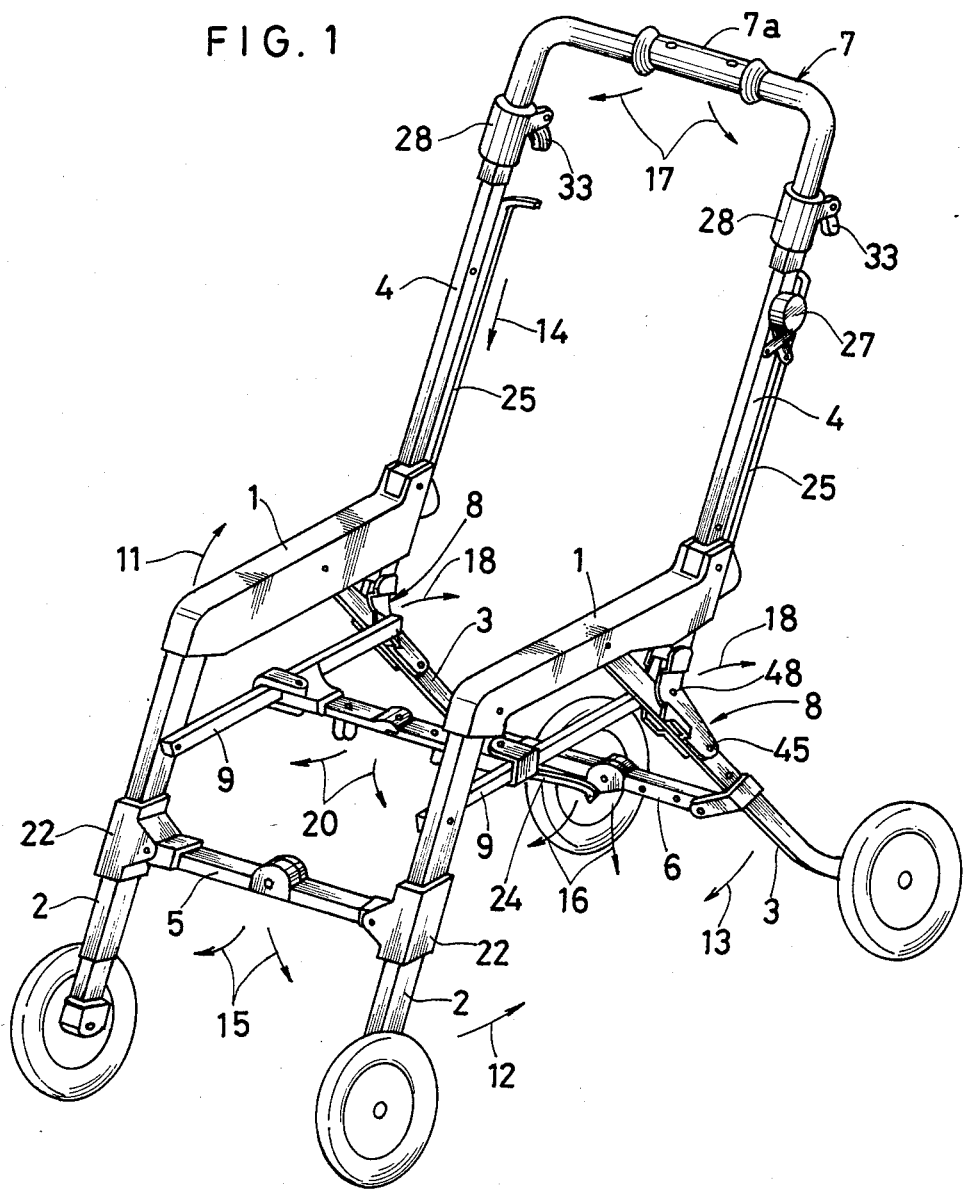
FIG. 1 is a perspective view of a baby carriage in its opened state according to an embodiment of the invention.
Figure 2:
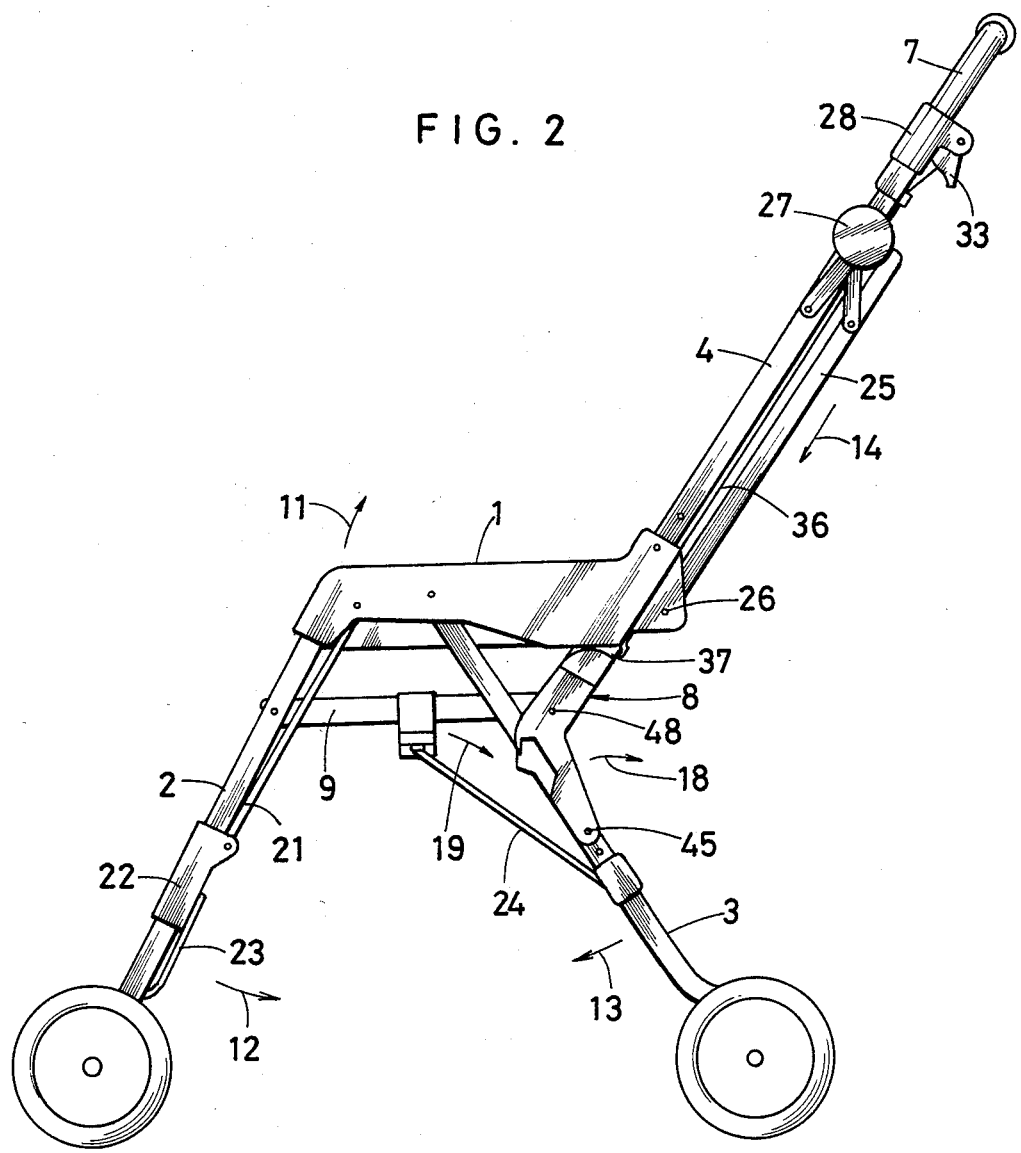
FIG. 2 is a right-hand side view of the baby carriage of FIG. 1.
Figure 3:
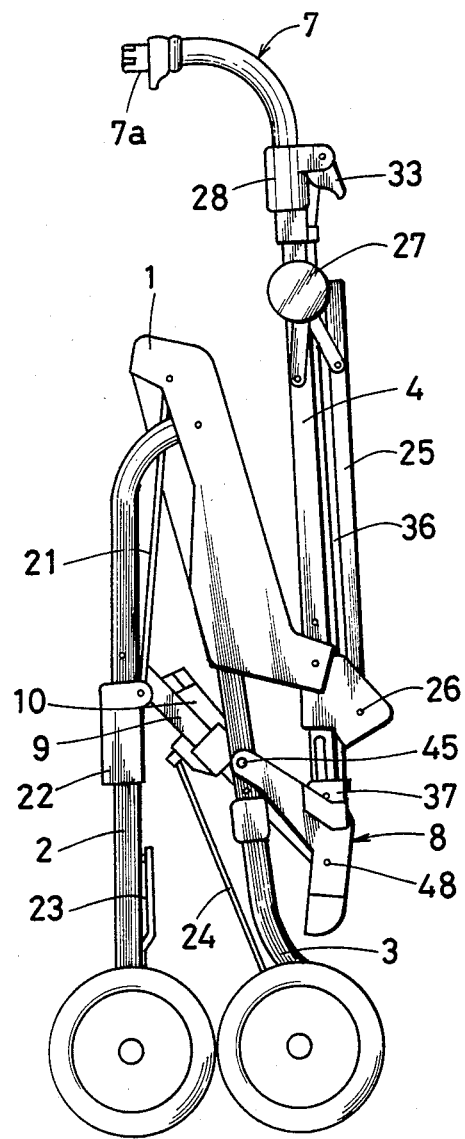
FIG. 3 is a right-hand side view of the baby carriage of FIG. 1 but in its closed state.

In FIGS. 1 through 3, a baby carriage having an embodiment of the invention applied thereto is shown. The baby carriage shown therein is basically the same as those disclosed in the aforesaid three prior applications.

That is, it comprises a pair of handrails 1, a pair of front legs 2, a pair of rear legs 3, a pair of push rods 4, a front leg connecting rod 5, a rear leg connecting rod 6, a push rod connecting member 7, support angle members 8, a pair of longitudinal connecting rods 9, and a central widthwise connecting rod 10. During change from the opened state shown in FIGS. 1 and 2 to the closed state shown in FIG. 3, the handrails 1 are turned in the direction of arrow 11, the front legs 2 are turned in the direction of arrow 12, the rear legs 3 are turned in the direction of arrow 13, the push rods 4 are displaced in the direction of arrow 14, the front leg connecting rod 5 is folded in the directions of arrows 15, the rear leg connecting rod 6 is folded in the directions of arrows 16, the push rod connecting member 7 is folded at its middle portion 7a in the directions of arrows 17, the support angle members 8 are turned in the direction of arrow 18, the longitudinal connecting rods 9 are turned or displaced in the direction of arrow 19, and the central widthwise connecting rod 10 is folded in the directions of arrows 20. In response to the folding movement of the front leg connecting rod 5, rear leg connecting rod 6, push rod connecting rod 7 and central widthwise connecting rod 10 to be folded, the pair of handrails 1, front legs 2, rear legs 3, push rods 4, support angle members 8 and longitudinal connecting rods 9 are reduced in spacing. In addition, members 21, 22, 23 and 24 shown in at least one of FIGS. 1 through 3 are members auxiliarily provided for operatively associating the aforesaid movements of the baby carriage with each other.

Disposed parallel to the push rods 4 are backrest holding rods 25, which are turnably supported at their lower ends by pivot pins 26, and their angle of inclination can be adjusted by reclining-adjustment members 27. While a seat to be attached to the baby carriage is omitted from the illustration, the backrest for the seat is held by the holding rods 25, the seat being fixedly attached to the longitudinal connecting rods 9 and central widthwise connecting rod 10.

When attention is given to the members capable of folding movement in the construction of the aforesaid baby carriage, particularly to the rear legs 3, push rods 4 and support angle members 8, it is seen that when support angle members 8 are turned in the direction of arrow 18 until their alignment with the push rods 4 is canceled, this cancellation initiates the folding movement. Thus, by fixing the angle in this state of alignment between the support angle members 8 and the push rods 4, the opened state of the baby carriage shown in FIGS. 1 and 2 is locked. A description will now be given of the mechanism for locking the opened state of the baby carriage, the mechanism for canceling this lock, the mechanism for locking the closed state and the mechanism for canceling this lock.

FIG. 4 is a perspective view showing the details of the arrangement applied to the push rod 4. The upper end of the push rod 4 is formed with a guide socket 28. The end portion 7b of the push rod connecting member 7 is directed for axial alignment with the push rod 4 and inserted in the guide socket 28. The end portion 7b of the push rod connecting member 7, as shown in FIG. 5, is made of a round pipe or bar, and is turnable in the guide socket 28 around the axis thereof. The lateral surface of the guide socket 28 is formed with an elongated guide opening 29 extending over a region of substantially right angle. The elongated guide opening 29 receives a guide pin 30 which is fixed on the end portion 7b of the push rod connecting member 7. The guide socket 28 is formed with a bracket 31 which is formed with throughgoing holes 32. An operating lever 33 adapted to fit in the bracket 37 is prepared. The operating lever 33 is formed with a throughgoing hole 34. With this throughgoing hole 34 aligned with the throughgoing hole 32 of the bracket 31, a pin 35 is inserted therein, whereby the operating lever 33 is supported turnable relative to the guide socket 28.

The downwardly directed surface of the operating lever 33 is formed with a recess 33a, as shown in broken lines in FIG. 4. The recess 33a is adapted to receive the guide pin 30 when the operating lever 33 is turned downward. When the guide pin 30 is received in the recess 33a in this manner, the end portion 7b of the push rod connecting member 7 becomes incapable of turning relative to the push rod 4, so that the push rod connecting member 7 cannot be folded in the directions of arrows 17 in FIG. 1.

The upper end of a wire 36 serving as connecting means is tied to the operating lever 33. The lower end of the wire 36 is tied to a sleeve 37. The sleeve 37 is axially slidably installed adjacent the lower end of the push rod 4. That is, the portion of the push rod 4 located adjacent the sleeve 37 is formed with elongated openings 38, as shown in FIGS. 4 and 6. A pin 39 extending through said elongated openings 38 is fixed to the sleeve 37. The sleeve 37 has its range of slide movement defined by the interaction between the elongated openings 38 and the pin 39.

Further, the sleeve 37 is constantly urged downward by a spring disposed inside the pipe-like push rod 4, e.g., a compression spring 40. That is, the compression spring 40 is disposed between a pin 41 fixed to the push rod 4 and the pin 39 fixed to the sleeve 37. When the sleeve 37 is positioned at the lower end of the range of slide movement by the elastic force of the compression spring 40, the operating lever 33 connected to the sleeve 37 by the wire 36 is in its downwardly directed position, as shown in FIGS. 1, 2 and 3. When the operating lever 33 is upwardly turned, the wire 36 is upwardly displaced to cause the sleeve 37 to slide upwardly against the elastic force of the compression spring 40.

The sleeve 37 is singly shown in perspective view in FIG. 7. The sleeve 37 has a lower end 42 which is substantially N-shaped. This lower end 42 is shaped to have correlation with the opened state locking-purpose engaging portion of the support angle member 8 to be later described.

FIG. 8 is an exploded perspective view of the support angle member 8. In addition, the attitude of the support angle member 8 shown in FIG. 8 corresponds to that shown in FIG. 3.

The support angle member 8 is formed of two parallel plates 43, which are symmetrical. One end of each plate 43 is formed with a throughgoing hole 44. The support angle member 8 is turnably connected to the middle portion of the corresponding rear leg 3 by a pivot pin 45 (FIGS. 1 through 3) extending through the throughgoing hole 44. At this time, the two plates 43 are positioned to hold the rear leg 3 therebetween. Further, the middle portion of each plate 43 is formed with a throughgoing hole 46. The push rod 4 is turnably connected to the support angle member 8 by a pivot pin 48 extending through the throughgoing hole 46 and a throughgoing hole 47 (FIG. 4) formed in the lower end of the push rod 4. In addition, the pivot pin 48 also turnably connects the rear end of the longitudinal connecting rod 9 to the support angle member 8. The push rod 4, like the rear leg 3, is held between the two plates 43.

The end of each plate 43 opposite to its end where the throughgoing hole 44 is formed with an opened state locking-purpose engaging portion 49. Further, the middle portion of each plate 43 is formed with a closed state locking-purpose engaging portion 50. The opened state locking-purpose engaging portion 49 is adapted to receive the N-shaped lower end 42 of the sleeve 37. Further, the closed state locking-purpose engaging portion 50 is shaped to receive substantially the whole of the sleeve 37 together with the lower end 42.

Referring again to FIG. 7, the opposite lateral surfaces of the sleeve 37 are formed with lock canceling-purpose engaging projections 51. Each lock canceling-purpose engaging projection 51 forms a ridge of inverted V-shaped cross-section extending substantially widthwise of the lateral surface of the sleeve 37, preferably in an arc. These surfaces formed with these lock canceling-purpose engaging projections 51 are those surfaces which are opposed to the plates 43 of the support angle member 8.

Referring to FIG. 8, each plate 43 of the support angle member 8 is formed with first and second bulging walls 52 and 53 bulging from the opened and closed state locking-purpose engaging portions 49 and 50, respectively. In a preferred embodiment, the plates 43 are made preferably of synthetic resin, and these bulging walls 52 and 53 are elastically deformable due to the elasticity of the synthetic resin. In addition, members corresponding to the bulging walls 52 and 53 may be later attached to the plate 43 so as to constitute the bulging walls 52 and 53 alone of elastically flexing deformable material.

Figure 9:
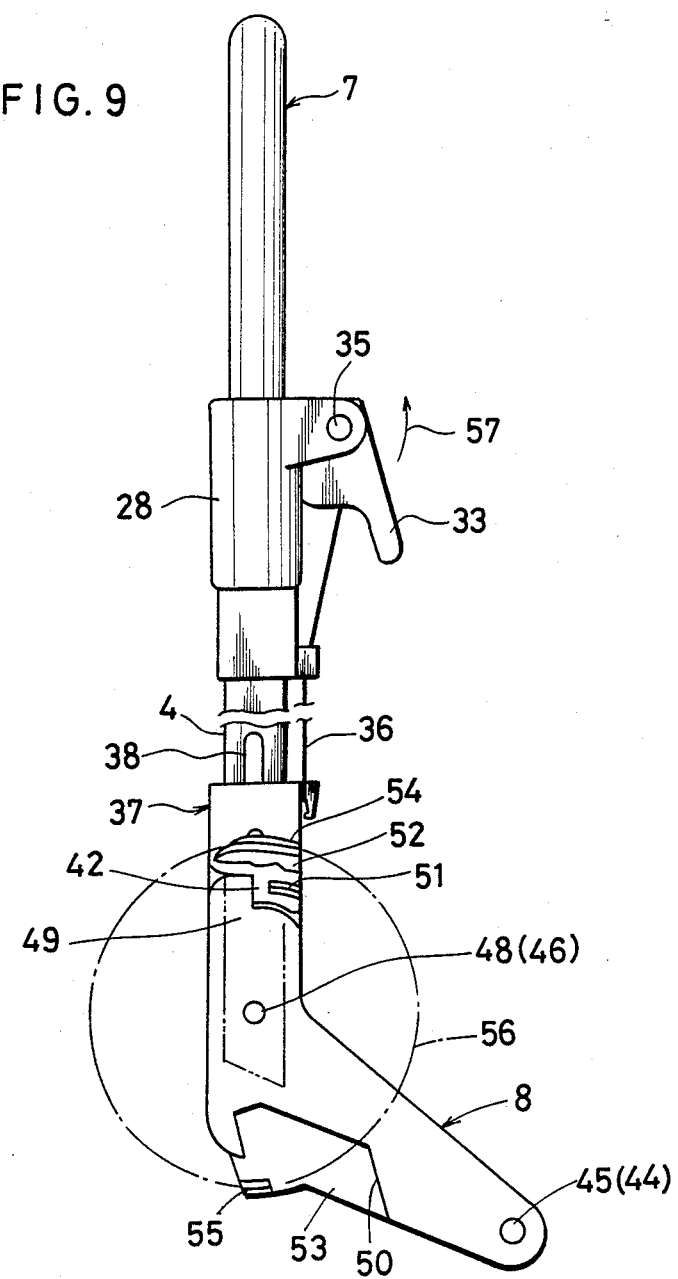

The aforesaid first and second bulging walls 52 and 53 are formed with opened and closed state canceling-purpose engaging projections 54 and 55, respectively. These engaging projections 54 and 55 each form a ridge of inverted V-shaped cross-section extending, preferably in an arc, as shown in FIG. 9, along a circumference 56 with the center at the pivot pin or throughgoing hole 46. That is, the distance of the opened state canceling-purpose engaging projection 54 from the throughgoing hole 46 is equal to the distance of the closed state canceling-purpose engaging projection 55 from the throughgoing hole 46.

The opened and closed state canceling-purpose engaging projections 54 and 55 are adapted to engage the lock canceling-purpose engaging projection 51 on the sleeve 37 slipped out of the opened or closed state canceling-purpose engaging portion 49 or 50 and, by this engagement, the position of the sleeve 37 on the push rod 4 can be temporarily held against the elastic force of the compression spring 40.

When the foldable baby carriage described so far is in the opened state shown in FIGS. 1 and 2, with the support angle member 8 extending along the upper half of the rear leg 3, the end of each support angle member 8 is aligned with the push rod 4, and to lock this state, the sleeve 37 has been slid downward for engagement with the opened state locking-purpose engaging portion 49 of the support angle member 8. This engagement inhibits the turning movement of the support angle member 8 and push rod 4 around the axis of the pivot pin 48, so that the push rod 4 and support angle member 8 are in the same state as that of a unitary member. Thus, this foldable baby carriage is so constructed that its opened state is established as a result of this engagement. Further, in the closed state, as shown in FIG. 3, with each support angle member 8 extending along the lower half of the rear leg 3, the middle portion of the support angle member 8 intersects the push rod 4, and to lock this state, each sleeve 37 has been slid downward for engagement with the closed state locking-purpose engaging portion 50 of the support angle member 8. In this state, the angle between the push rod 4 and the support angle member 8 around the pivot pin 38 is fixed. Thus, this baby carriage is so constructed that its closed state is established on the basis of this engagement.

The opened and closed state locking mechanism of the baby carriage will now be described with reference to FIGS. 9 through 13. In addition, FIGS. 9 through 13 show the relative positional relation between the push rod 4, support angle member 8 and sleeve 37, with the push rod 4 shown in its vertically directed position throughout these figures. Further, it is to be pointed out that in these figures there is a portion where the push rod 4, support angle member 8 and sleeve 37 overlap each other, there is an area where they are shown overlapping each other by overlooking their actual positional relation.

FIG. 9 shows the opened state of the baby carriage of FIGS. 1 and 2, with the lock in action. That is, the lower end 42 of the sleeve 37 is engaged with the opened state locking-purpose engaging portion 49 of the support angle member 8. Further, the lock canceling-purpose engaging projections 51 formed on the support angle member 8 are positioned away from the opened state canceling-purpose engaging projection 54.

To cancel the lock in the opened state of the baby carriage of FIG. 9, the operating lever 33 is turned in the direction of arrow 33. In response thereto, as shown in FIG. 10, the wire 36 is pulled up in the direction of arrow 58, and hence the sleeve 37 is slid on the push rod 4 in the direction of arrow 58. In response thereto, the lock canceling-purpose engaging projections 51 on the sleeve 37 pass across the opened state canceling-purpose engaging projection 54 while elastically deforming the first bulging wall 52. The sleeve 37 has come out of the opened state locking-purpose engaging portion 49, and to temporarily hold this state against the elastic force of the compression spring 40 (FIG. 6), the lock canceling-purpose engaging projections 51 engage the opened state canceling-purpose engaging projections 54. In addition, in FIG. 10, it is preferable that after the operating lever has been turned in the direction of arrow 57 (FIG. 9), it be held in its attitude for a while unless it is pulled downward by the wire 36. The reason is that it is preferable that in the subsequent operation for closing the baby carriage, the operating lever 33 be turned downward after the guide pin 30 has been displaced to such a position that it is not received in the recess 33a in the operating lever 33 turned downward again. Normally, the operating lever 33 can be held in the attitude shown in FIG. 10 by the friction which acts around the pin 35. In addition, if a rigid rod is used in place of the wire, the attitude of the operating lever 33 can be held by the thrust action of said rod unless the sleeve 37 is displaced downward.

When the operation for closing the baby carriage is started, as shown in FIG. 11, the push rod 4 and support angle member 8 are turned relative to each other around the axis of the pivot pin 48. At this time, the lock canceling-purpose engaging projection 51 first slides along the opened state canceling-purpose engaging projection 54 while maintaining its engagement with the opened state canceling-purpose engaging projection 54 but as soon as it is disengaged from the opened state canceling-purpose engaging projection 54, it is slid downward by the action of the compression spring 40. In FIG. 11, the sleeve 37 is shown in the state in which its lower end has still engaged part of the opened state locking-purpose engaging portion 49 of the support angle member 8, but when the push rod 4 and support angle member 8 are further turned relative to each other, the sleeve 37 is completely separated from the opened state locking-purpose engaging portion 49 and, this time, it approaches the closed state locking-purpose engaging portion 50.

Figure 12:
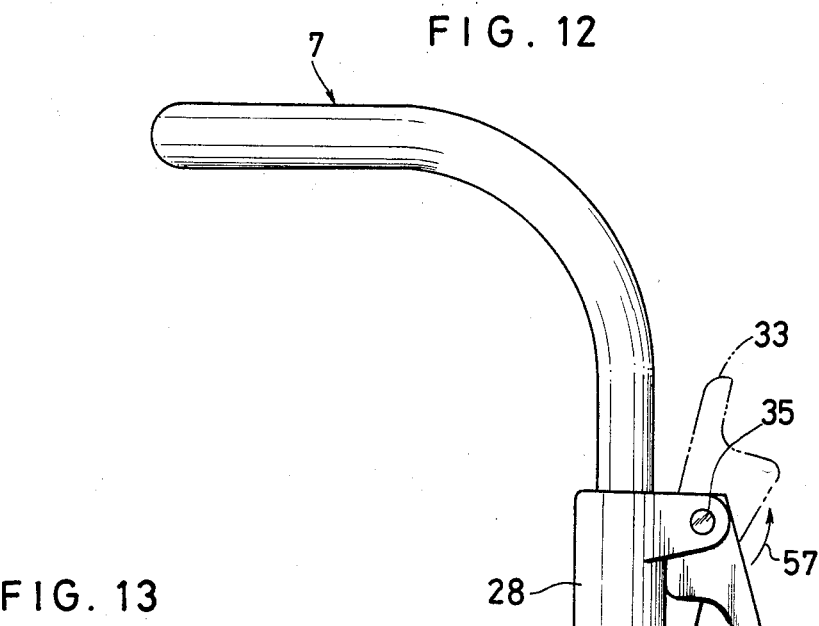

FIG. 12 shows the state in which the sleeve 37 has engaged the closed state locking-purpose engaging portion 50. The state of FIG. 12 corresponds to the closed state of the baby carriage shown in FIG. 3. During change from the state of FIG. 11 to the state of FIG. 12, the sleeve 37 urged to slide downward on the push rod 4, when entering the closed state locking-purpose engaging portion 50 of the support angle member 8, slides on the push rod 4 along the contour of the support angle member 8 and then fits in the closed state locking-purpose engaging portion 50. At this time, the lock canceling-purpose engaging projection 51 passes the position below the closed state canceling-purpose engaging projection 55 shown in FIG. 12.

Figure 13:
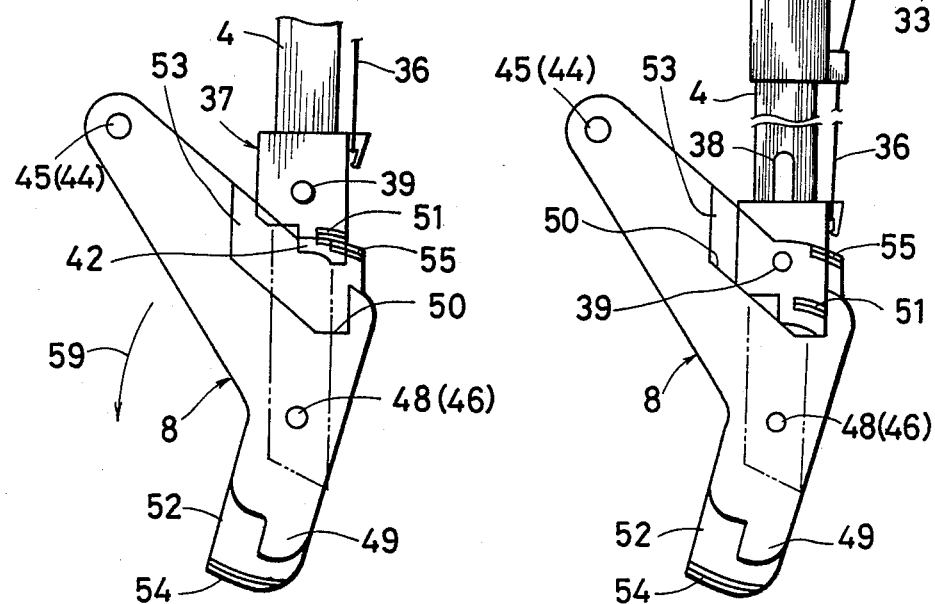

To cancel the lock in the closed state of the baby carriage shown in FIG. 12 and then establish the opened state again, the operating lever 33 is turned in the direction of arrow 57 again. In response thereto, as shown in FIG. 13, the sleeve 37 is displaced upward by the wire 36, and the lock canceling-purpose engaging projections 51 pass across the closed state canceling-purpose engaging projection 55 while elastically deforming the second bulging wall 53. And the lock canceling-purpose engaging projection 51 engages the closed state canceling-purpose engaging projection 55, whereby the position of the sleeve 37 on the push rod 4 is temporarily held.

After the state of FIG. 13 has been attained, the operation of closing the baby carriage is started. The action produced by this operation, particularly the relative action between the push rod 4 and the support angle member 8, is substantially the same as aforesaid action for change from the opened state to the closed state.

When the baby carriage is to be closed from the state of FIG. 13, the support angle member 8 is turned relative to the push rod 4 in the direction of arrow 59 around the axis of the pivot pin 48. In response thereto, first the lock canceling-purpose engaging projection 51 slides along the closed state canceling-purpose engaging projection 55, but when they pass the terminal end of the closed state canceling-purpose engaging projection 55, the sleeve 37 slides downward on the push rod 4 by the elastic force of the compression spring 40.

In the process of change from the closed state to the opened state of the baby carriage, a state shown in FIG. 11, for example, is obtained. During the time from the state of FIG. 11 to the final state of FIG. 9, the sleeve 37 slides on the push rod 4 while contacting the opened state locking-purpose engaging portion 49. When the push rod 4 is aligned with the support angle member 8, as shown in FIG. 9, the sleeve 37 engages the opened state locking-purpose engaging projection 49. In this manner, the baby carriage is locked again in its opened state.

In addition, FIGS. 4 through 13 illustrate only those of the symmetrically disposed members which are positioned on one side of the baby carriage, it being noted that such arrangement is equally provided on both sides.

The support angle member 8 and sleeve 37 shown in the aforesaid embodiment may be altered in their shape and construction so long as their functions are not impeded. For example, while the support angle member has been made of two plates 43, it may be made of a single member.

Further, the operating lever 33 and its associated wire 36 for upwardly sliding the sleeve 37 are not absolutely necessary. For example, the sleeve 37 may be directly acted on for upward slide movement. In this case, an operating portion bulging from the sleeve 37 may be provided for facilitating the operation on the sleeve 37.

Although the present invention has been described and illustrated in detail, it is clearly understood that the same is by way of illustration and example only and is not to be taken by way of limitation, the scope of the present invention being limited only by the terms of the appended claims.

What is claimed is:

1. A mechanism for locking the opened and closed states of a baby carriage comprising:
   a pair of rear legs extending rearwardly downward from the middle portion of the baby carriage,
   a pair of support angle members each turnably connected at one of their respective ends to the middle portion of the baby carriage, whereby they are turnable to extend along the upper or lower halves of said rear legs,
   a pair of push rods turnably connected at the lower ends thereof respectively to the middle portions of said support angle members,
   a pair of sleeves axially slidably installed adjacent the lower ends of said push rods,
   springs for urging said sleeves downward,
   each said support angle member being formed at the other end thereof with an opened state locking-purpose engaging portion and at the middle portion thereof with a closed state locking-purpose engaging portion,
   in the opened state of the baby carriage, each support angle member being positioned along the upper half of the rear leg while the other end of the support angle member is aligned with the associated push rod, and in order to lock this state, each said sleeve sliding downward to engage said open state locking-purpose engaging portion of the associated support angle member,
   in the closed state of the baby carriage, each support angle member being positioned along the lower half of the associated rear leg while its middle portion intersects the push rod, and in order to lock this state, each said sleeve sliding downward to engage said closed state locking-purpose engaging portion,
   said mechanism for locking the opened and closed states of a baby carriage being characterized in that:
   the surface of said sleeve opposed to said support angle member is formed with a lock canceling-purpose engaging projection,
   the support angle member is formed with first and second bulging walls bulging from said opened and closed state locking-purpose engaging portions,
   the first and second bulging walls are respectively formed with opened and closed state canceling projections adapted to engage said lock canceling-purpose engaging projection on said sleeve escaping from said said opened and closed state locking-purpose engaging portions so as to temporarily retain the position of said sleeve on said push rod against the force of said spring.

2. A mechanism as set forth in claim 1, wherein said support angle member is made wholly of resin.

3. A mechanism as set forth in claim 1, further comprising an operating member positioned on a relatively upper region of said push rod, and an operatively connecting member for transmitting the action of said operating member to said sleeve so as to slide said sleeve upwardly on said push rod against the elastic force of said spring.

4. A mechanism as set forth in claim 3, wherein said operating member is a lever attached to said push rod, and said operatively connecting member is a wire which connects said lever and said sleeve.

5. A mechanism as set forth in claim 1, wherein said opened and closed state canceling-purpose engaging projections are positioned on the circumference of a common circle with its center at the point of connection of said support angle member to said rear leg.

6. A mechanism as set forth in claim 5, wherein said opened and closed state canceling-purpose engaging projections extend in arcs along said circumference.

7. A mechanism as set forth in claim 6, wherein said opened and closed state canceling-purpose engaging projections are V-shaped in cross-section.

* * * * *